(12) United States Patent
Liu et al.

(10) Patent No.: US 11,393,064 B2
(45) Date of Patent: Jul. 19, 2022

(54) IMAGE PROCESSING DEVICE AND IMAGE PROCESSING METHOD

(71) Applicant: ALi Corporation, Hsinchu (TW)

(72) Inventors: Shan Jian Liu, Guangdong (CN); Feng Gao, Guangdong (CN); Lun Liang, Guangdong (CN)

(73) Assignee: ALi Corporation, Hsinchu (TW)

(*) Notice: Subject to any disclaimer, the term of this patent is extended or adjusted under 35 U.S.C. 154(b) by 36 days.

(21) Appl. No.: 17/134,484

(22) Filed: Dec. 27, 2020

(65) Prior Publication Data

US 2021/0358073 A1 Nov. 18, 2021

(30) Foreign Application Priority Data

May 14, 2020 (CN) .......................... 202010408535.8

(51) Int. Cl.
*G06T 1/20* (2006.01)
*G06T 3/40* (2006.01)
*G06T 5/00* (2006.01)

(52) U.S. Cl.
CPC .............. *G06T 1/20* (2013.01); *G06T 3/4007* (2013.01); *G06T 3/4038* (2013.01); *G06T 5/002* (2013.01); *G06T 5/009* (2013.01); *G06T 2207/20021* (2013.01); *G06T 2207/20208* (2013.01)

(58) Field of Classification Search
CPC ................................. G06T 1/20; G06T 3/4007
See application file for complete search history.

(56) References Cited

U.S. PATENT DOCUMENTS

| | | | | |
|---|---|---|---|---|
| 5,952,994 A * | 9/1999 | Ong | .......................... | G06T 3/40 345/565 |
| 7,525,547 B1 * | 4/2009 | Diard | ........................ | G06T 1/20 345/522 |
| 2006/0269166 A1 * | 11/2006 | Zhong | ................... | G06T 3/4007 382/300 |
| 2015/0130856 A1 * | 5/2015 | Funatsu | ................... | G09G 3/30 345/77 |
| 2018/0108113 A1 * | 4/2018 | Guo | ...................... | G06T 3/4053 |

FOREIGN PATENT DOCUMENTS

CN 104104888 10/2014

\* cited by examiner

*Primary Examiner* — Phi Hoang
(74) *Attorney, Agent, or Firm* — JCIPRNET

(57) ABSTRACT

An image processing device and an image processing method are provided. A frame divider divides an original frame into a plurality of divided blocks. A multi-core circuit coupled to the frame divider and includes a plurality of processing cores and a frame stitching circuit. The processing cores perform an image processing process on the divided blocks to generate a plurality of processed frame blocks. The frame stitching circuit performs an image stitching process according to the processed frame blocks to generate a processed frame. The processing cores fetch the divided blocks and a plurality of extension pixels extending from the divided blocks to perform the image processing process, and a column number of the extension pixels is configured according to a window size requested by at least one window algorithm of the image processing process.

12 Claims, 7 Drawing Sheets

IMAGE PROCESSING DEVICE AND IMAGE PROCESSING METHOD

CROSS-REFERENCE TO RELATED APPLICATION

This application claims the priority benefit of China application serial no. 202010408535.8, filed on May 14, 2020. The entirety of the above-mentioned patent application is hereby incorporated by reference herein and made a part of this specification.

BACKGROUND

1. Technical Field

The disclosure relates to an image processing method, and more particularly, to an image processing device and an image processing method capable of enhancing processing efficiency.

2. Description of Related Art

With the advancement of display technology, various kinds of image player devices have been continuously developed to fulfill requirements of higher image resolution, richer colors and better effects. Specifically, as sizes of the image player devices are getting bigger and bigger, the requirements of image quality are becoming higher and higher as well. For example, displays having ultra-high definition (UHD) (e.g., 4K, 8K resolutions) have gradually become popular. As a size or resolution of a played image increases, performance of an image processing chip utilized for generating the image shall be correspondingly improved to support a frame rate of 30 frames per second (30 fps), 60 frames per second (60 fps) or even higher. However, in general cases, the performance of the image processing chip is limited by manufacturing process techniques, and power consumption of the image processing chip increases with the performance. Therefore, how to improve the output image quality of the image processing chip under limited hardware conditions has been an issue concerned by a person of ordinary skill in the art.

SUMMARY

In view of this, the disclosure provides an image processing device and an image processing method, which may enhance image processing performance and achieve good display quality.

According to the embodiments of the disclosure, an image processing device includes a frame divider and a multi-core circuit. The frame divider divides an original frame into multiple divided blocks. The multi-core circuit is coupled to the frame divider, and includes multiple processing cores and a frame stitching circuit. The multiple processing cores perform an image processing process on the divided blocks to generate multiple processed frame blocks. The frame stitching circuit is coupled to the processing cores and performs an image stitching process according to the multiple processed frame blocks to generate a processed frame. The processing cores fetch the divided blocks and multiple extension pixels extending from the divided blocks to perform the image processing process, and a column number of the extension pixels is configured according to a window size requested by a window algorithm of the image processing process.

According to the embodiments of the disclosure, an image processing method includes the following steps. An original frame is divided into multiple divided blocks. The multiple divided blocks and multiple extension pixels extending from the divided blocks are respectively fetched by multiple processing cores to perform an image processing process to generate multiple processed frame blocks. A column number of the extension pixels is configured according to a window size requested by a window algorithm of the image processing process. An image stitching process is performed according to the processed frame blocks to generate a processed frame.

Based on the foregoing, according to the embodiments of the disclosure, the original frame is divided into the multiple divided blocks. By employing the multiple processing cores to respectively perform in parallel the image processing process on the multiple divided blocks, efficiency of the image processing process may be significantly enhanced under limited hardware conditions. In addition, before the image processing process is performed on the divided blocks, the number of the extension pixels may be flexibly configured according to a window size specified by one or more window algorithms of the image processing process, such that the processing cores may respectively perform the image processing process on the divided pixels according to accurate pixel information. As a result, the image processing method and the image processing device of the embodiments of the disclosure may more flexibly support various types of window algorithms and facilitate upgrades of the window algorithms.

In order to make the aforementioned and other objectives and advantages of the disclosure comprehensible, embodiments accompanied with figures are described in detail below.

DESCRIPTION OF THE EMBODIMENTS

Figure 1:
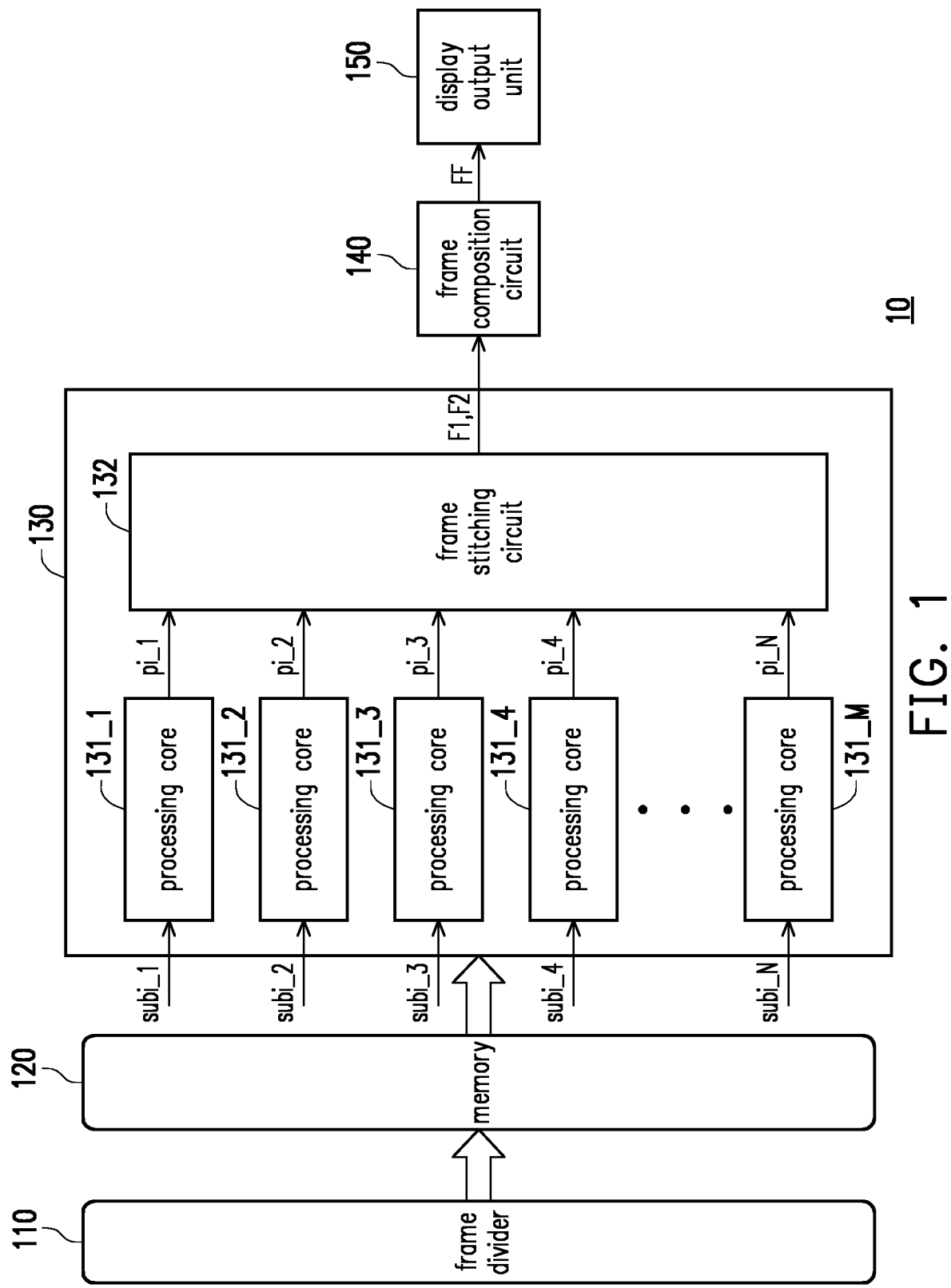
FIG. 1 is a schematic diagram of an image processing device according to an embodiment of the disclosure.

Several embodiments of the disclosure will be described in detail with reference to the drawings. With respect to reference numerals described in the following description, when identical reference numerals appear in different drawings, elements denoted by the identical reference numerals shall be regarded as identical or similar elements. These embodiments are merely a part of the disclosure, and do not disclose all implementations of the disclosure. More specifically, these embodiments are merely examples of the device and method described in the appended claims of the disclosure.

FIG. 1 is a schematic diagram of an image processing device 10 according to an embodiment of the disclosure. As shown in FIG. 1, the image processing device 10 may include a frame divider 110, a memory 120 and a multi-core circuit 130.

The frame divider 110 divides an original frame into multiple divided blocks, and records the divided blocks in the memory 120. The memory 120 is utilized for caching image data, and may be a static random-access memory (SRAM) or a synchronous dynamic random access memory (SDRAM), but is not limited to thereto. According to an embodiment, the original frame may be a frame generated by decoding a video or a network streaming video. In general, in order to improve display quality, the original frame obtained by decoding the video may need further image processing processes before the original frame is actually played. In addition, according to an embodiment, the frame divider 110 may divide the original frame into multiple vertical stripe blocks. However, a quantity of the divided blocks and a division method thereof are not limited in the disclosure, and may be adjusted based on practical requirements. In addition, sizes of the divided blocks may be identical or different. Moreover, according to an embodiment, the original frame may be a multi-grid frame, a side-by-side frame, a picture-in-picture frame, or the like including multiple display pictures. That is, each of the divided blocks of the original frame may include pixel blocks of one or more display pictures. For example, if the original frame is a four-grid frame having four sub-pictures and the original frame is evenly divided into four vertical stripe blocks, each of the vertical stripe blocks includes two pixel blocks respectively corresponding to two of the four sub-pictures.

The multi-core circuit 130 is coupled to the memory 120, and includes M processing cores 131_1 to 131_M (M is an integer greater than 1) and a frame stitching circuit 132. A part or all of the processing cores 131_1 to 131_M may respectively fetch corresponding divided blocks subi_1 to subi_N (N is an integer greater than 1 and less than or equal to M) from the memory 120 according to the direct memory access (DMA) technology. In addition, although FIG. 1 is illustrated according to an example in which N=M, the disclosure is not limited thereto.

For example, assume that M=N=4. The processing core 131_1 may obtain the divided block subi_1 from the memory 120; the processing core 131_2 may obtain the divided block subi_2 from the memory 120; the processing core 131_3 may obtain the divided block subi_3 from the memory 120; and the processing core 131_4 may obtain the divided block subi_4 from the memory 120. In other words, the processing cores 131_1 to 131_4 respectively obtain the corresponding divided blocks subi_1 to subi_4 for subsequent image processing, and the divided blocks subi_1 to subi_4 are respectively processed by the corresponding processing cores 131_1 to 131_4.

According to an embodiment, the processing cores 131_1 to 131_M perform an image processing process on the multiple divided blocks subi_1 to subi_N to generate multiple processed frame blocks pi_1 to pi_N. For example, the processing cores 131_1 to 131_M respectively perform image processing operations of denoising, color difference adjustment, sharpness enhancement, size adjustment, and the like on the divided blocks subi_1 to subi_N. In other words, the image processing process may include an image scaling process, an image denoising process, a high dynamic range adjustment process, an image contrast adjustment process, an image tone adjustment process, an image sharpness adjustment process, a color space conversion process, or a combination thereof. In addition, the processing cores 131_1 to 131_M fetch the divided blocks subi_1 to subi_N and multiple extension pixels extending outward from the divided blocks subi_1 to subi_N to perform the image processing process. Here, a column number of the extension pixels is configured according to a window size requested by a window algorithm of the image processing process.

In detail, based on a principle of the window algorithm employed in the image processing process, the processing cores 131_1 to 131_M have to fetch multiple adjacent pixels from the original frame for calculation to generate an output pixel. For example, according to a high-quality scaling algorithm, it is necessary to fetch one or more adjacent pixels located on left and right sides of an input pixel for calculation. In addition, different window algorithms may require different numbers of adjacent pixels. That is, different window algorithms may require different window sizes. According to some window algorithms, edge pixels of a first column located on a frame edge may be copied to generate the adjacent pixels required by the window algorithms. According to an embodiment, since the processing cores 131_1 to 131_M are respectively responsible for the image processing process of the different divided blocks subi_1 to subi_N, in addition to pixels of the divided blocks subi_1 to subi_N, the processing cores 131_1 to 131_M have to further fetch the multiple extension pixels extending outward from the divided blocks subi_1 to subi_N from the memory 120 for the image processing process.

According to an embodiment, the image processing process performed by the processing cores 131_1 to 131_M may include a first image processing process in which a first window algorithm is applied and a second image processing process in which a second window algorithm is applied. A window size of the first window algorithm is a first value, and a window size of the second window algorithm is a second value. A required number of the extension pixels is configured based on the window size of the image processing process. Therefore, the column number of the extension pixels may be configured according to the first value and/or the second value. According to an embodiment, the processing cores 131_1 to 131_M sequentially perform the first image processing process and the second image processing process. In such a case, the column number of the extension pixels is configured by a sum of the first value of the first window algorithm and the second value of the second window algorithm. For example, if X columns of extension pixels are required for executing of the first window algorithm and Y columns of extension pixels are required for executing the second window algorithm, the processing cores 131_1 to 131_M fetch (X+Y) columns of extension pixels in total. More specifically, when the processing cores 131_1 to 131_M sequentially execute various kinds of image processing processes, the processing cores 131_1 to 131_M may fetch 16 (or a multiple of 16) columns of extension pixels. In addition, according to an alternative embodiment, the column number of the extension pixels is configured according to a maximum value between the first value of the first window algorithm and the second value of the second window algorithm. Based on the foregoing embodiments of the disclosure, it can been seen that the column number of the extension pixels may be flexibly configured according to window sizes of one or more image processing processes, such that the applicable scope is more flexible and broader.

Figure 2A:
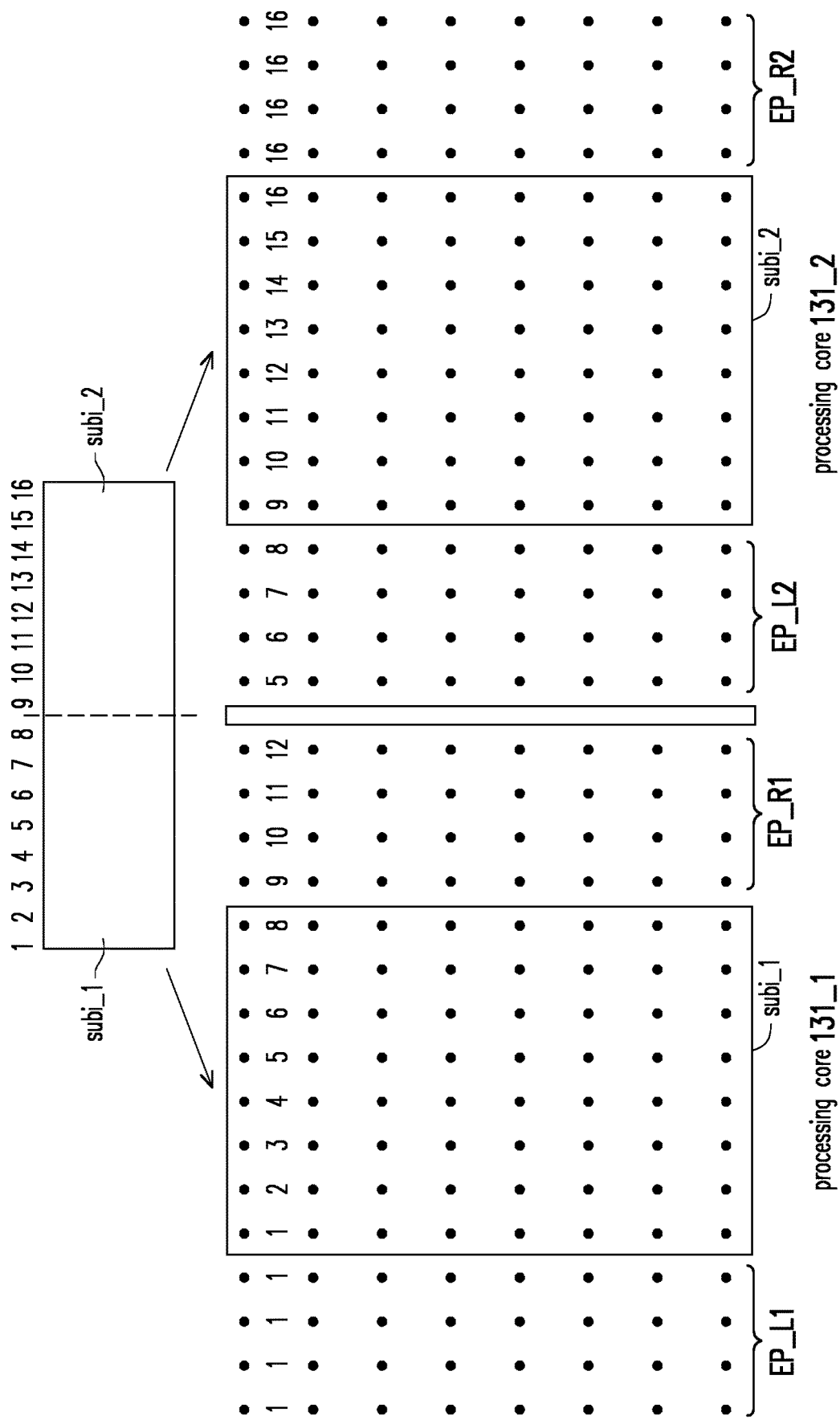
FIG. 2A to FIG. 2C are schematic diagrams illustrating fetching extension pixels according to an embodiment of the disclosure.
Figure 2B:
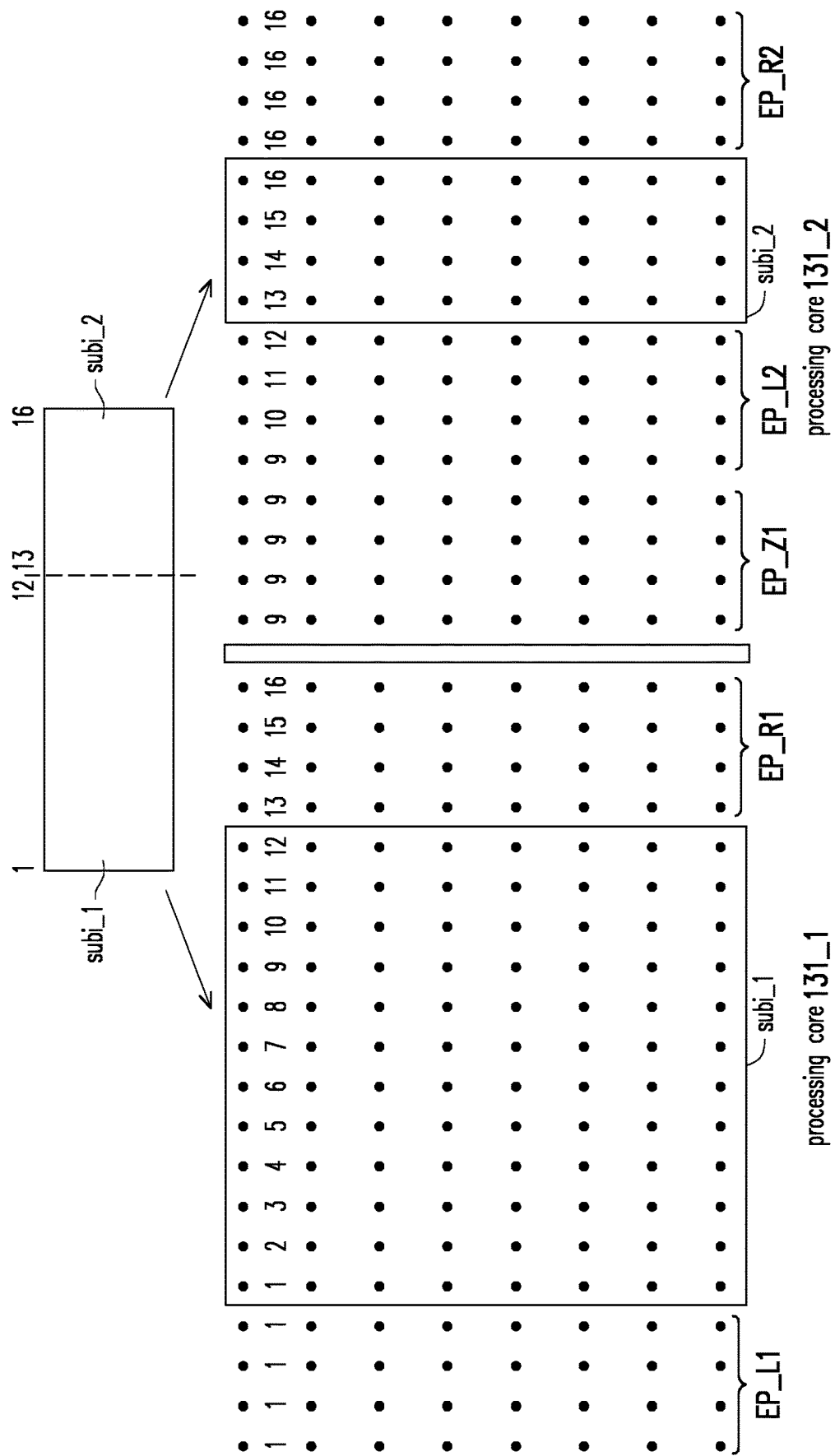
Figure 2C:
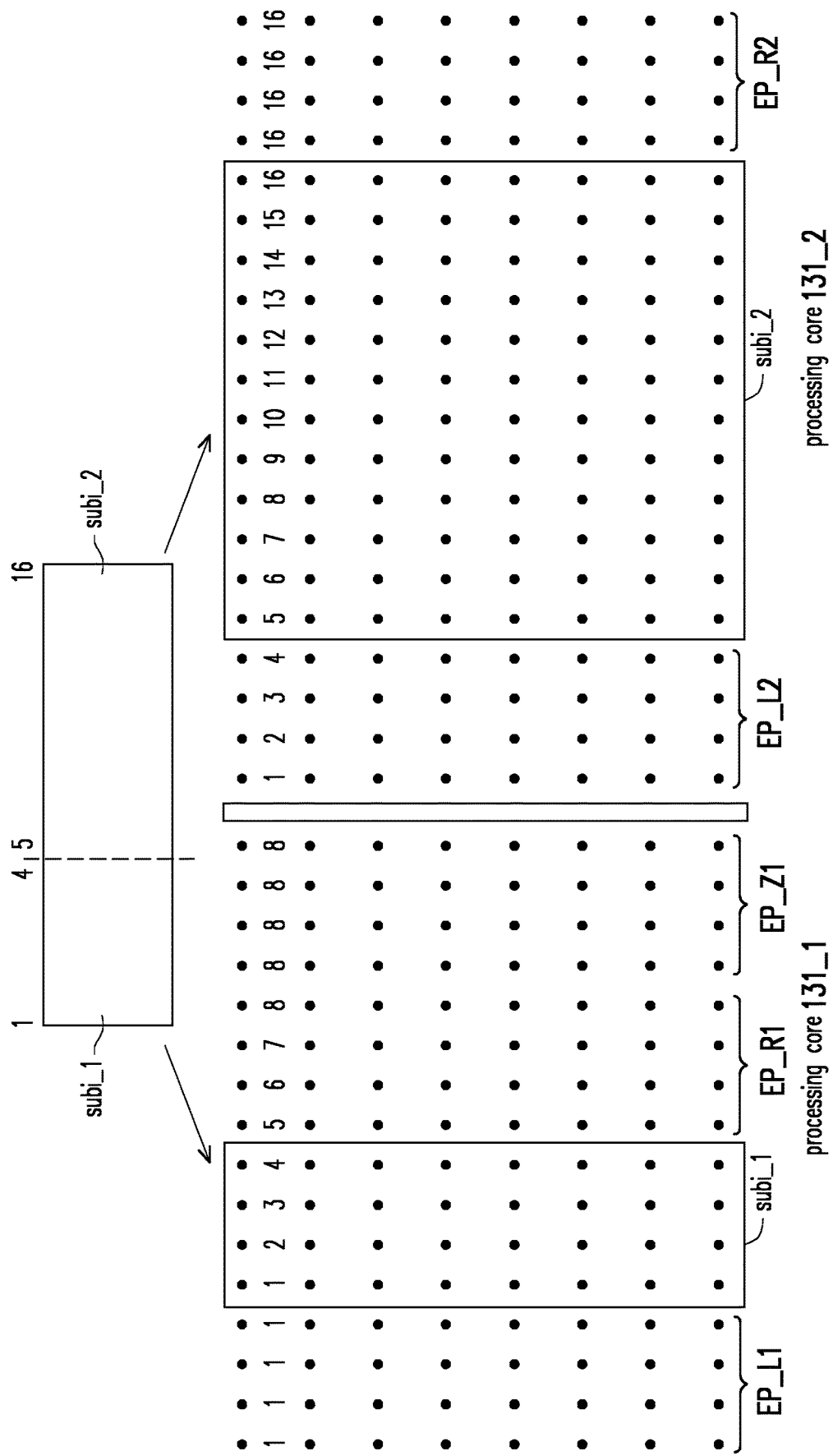

For example, please refer to FIG. 2A to FIG. 2C, which are schematic diagrams illustrating fetching the extension pixels according to an embodiment of the disclosure. For the sake of convenient description, it is assumed that the original frame includes 16 columns of the pixels, and is divided into a left block and a right block, but the disclosure is not limited thereto. With reference to FIG. 2A to FIG. 2C and the foregoing embodiments, a person of ordinary skill in the art may derive or deduce by analogy alternative implementations for original frames with different sizes.

First, with reference to FIG. 2A, the processing core 131_1 and the processing core 131_2 are respectively responsible for the image processing process on the divided block subi_1 and the divided block subi_2. The processing core 131_1 may obtain the divided block subi_1 and multiple extension pixels EP_L1 and EP_R1 extending outward from the divided block subi_1 from the memory 120. Here, if the column numbers of the extension pixels EP_L1 and EP_R1 are configured to be four, the processing core 131_1 has to respectively fetch at least four columns of the multiple extension pixels EP_L1 located left of the divided block subi_1 and four columns of the multiple extension pixels EP_R1 located right of the divided block subi_1. Since the divided block subi_1 includes the $1^{st}$ to $8^{th}$ columns of the pixels of the original frame, the multiple extension pixels EP_R1 extending outward from the divided block subi_1 may include the $9^{th}$ to $12^{th}$ columns of the pixels of the original frame, and the multiple extension pixels EP_L1 extending outward from the divided block subi_1 may include the $1^{st}$ column of the pixels of the original frame. In addition, since the divided block subi_1 is located at an edge of the original frame, the processing core 131_1 may repeatedly fetch the $1^{st}$ column of the pixels of the original frame to be the four columns of the extension pixels EP_L1 located left of the divided block subi_1.

Similarly, the processing core 131_2 may obtain the divided block subi_2 and multiple extension pixels EP_L2 and EP_R2 extending outward from the divided block subi_2 from the memory 120. Here, if the column number of the extension pixels is configured to be four, the processing core 131_2 has to respectively fetch at least four columns of the multiple extension pixels EP_L2 located left of the divided block subi_2 and four columns of the multiple extension pixels EP_R2 located right of the divided block subi_2. Since the divided block subi_2 includes the $9^{th}$ to $16^{th}$ columns of the pixels of the original frame, the multiple extension pixels EP_L2 and EP_R2 extending outward from the divided block subi_2 may respectively include the $5^{th}$ to $8^{th}$ columns of the pixels of the original frame and the $16^{th}$ column (i.e., the last column) of the pixels of the original frame. Since the divided block subi_2 is located at an edge of the original frame, the processing core 131_2 may repeatedly fetch the $16^{th}$ column of the pixels of the original frame to be the four columns of the extension pixels EP_R2 located right of the divided block subi_2.

Based on the foregoing, the processing core 131_1 may perform the image processing process according to the divided block subi_1 and the multiple extension pixels EP_L1 and EP_R1 extending outward from the divided block subi_1, and the processing core 131_2 may perform the image processing process according to the divided block subi_2 and the multiple extension pixels EP_L2 and EP_R2 extending outward from the divided block subi_2, so as to correctly calculate the output pixel.

In addition, according to the embodiment shown in FIG. 2A, the processing cores 131_1 and 131_2 fetch the same number of pixels for the image processing process. That is, the divided blocks subi_1 and subi_2 have the same size. However, the disclosure is not limited to this embodiment. According to alternative embodiments, the processing cores 131_1 and 131_2 may fetch different numbers of pixels for the image processing process. In such a situation, the sizes of the divided blocks subi_1 and subi_2 may be different.

Please refer to FIG. 2B, in which the processing cores 131_1 and 131_2 are respectively responsible for the image processing process on the divided blocks subi_1 and subi_2. According to the embodiment of FIG. 2B, the divided block subi_1 includes twelve columns of pixels, and the divided block subi_2 includes four columns of pixels. In this case, since the divided block subi_1 includes the $1^{st}$ to $12^{th}$ columns of the pixels of the original frame, the multiple extension pixels EP_L1 and EP_R1 extending outward from the divided block subi_1 may respectively include the $1^{st}$ column of the pixels of the original frame and the $13^{th}$ to $16^{th}$ columns of the pixels of the original frame. The processing core 131_1 has to perform the image processing process based on the twenty columns of the pixels. In addition, since the divided block subi_2 includes the $13^{th}$ to $16^{th}$ columns of the pixels of the original frame, the multiple extension pixels EP_L2 and EP_R2 extending outward from the divided block subi_2 may respectively include the $9^{th}$ to $12^{th}$ columns of the pixels of the original frame and the $16^{th}$ column of the pixels of the original frame. Moreover, under a condition where the processing core 131_2 is configured to process sixteen columns of pixels, the processing core 131_2 may be configured to copy the $9^{th}$ column of the pixels of the original frame to generate the remaining extension pixels EP_Z1.

Similarly, please refer to FIG. 2C, in which the divided block subi_1 includes four columns of pixels, and the divided block subi_2 includes twelve columns of pixels. In this case, since the divided block subi_1 includes the $1^{st}$ to $4^{th}$ columns of the pixels of the original frame, the multiple extension pixels EP_L1 and EP_R1 extending outward from the divided block subi_1 may respectively include the $1^{st}$ column of the pixels of the original frame and the $5^{th}$ to $8^{th}$ columns of the pixels of the original frame. In addition, under a condition where the processing core 131_1 is configured to process sixteen columns of pixels, the processing core 131_1 may be configured to copy the $8^{th}$ column of the pixels of the original frame to generate the remaining extension pixels EP_Z1. Furthermore, since the divided block subi_2 includes the $5^{th}$ to $16^{th}$ columns of the pixels of the original frame, the multiple extension pixels EP_L2 and EP_R2 extending outward from the divided block subi_2 may respectively include the $1^{st}$ to $4^{th}$ columns of the pixels of the original frame and the $16^{th}$ column of the pixels of the original frame.

The frame stitching circuit 132 is coupled to the processing cores 131_1 to 131_M, and may receive processed frame blocks pi_1 to pi_N which are generated by the processing cores 131_1 to 131_M after the image processing process, and may perform an image stitching process according to the multiple processed frame blocks pi_1 to pi_N to generate a processed frame F1. Specifically, after the image processing process is performed on the divided blocks subi_1 to subi_N, since the processing cores 131_1 to 131_M utilize the extension pixels for the image processing process, the frame stitching circuit 132 has to extract specific pixels from the processed frame blocks pi_1 to pi_N and discard unnecessary pixels to stich the complete processed frame F1. That is, the frame stitching circuit 132 has to fetch partial pixels from the processed frame blocks pi_1 to pi_N for the image stitching process. Specific implementation details of the image stitching process will be described in the following embodiments.

Figure 3:
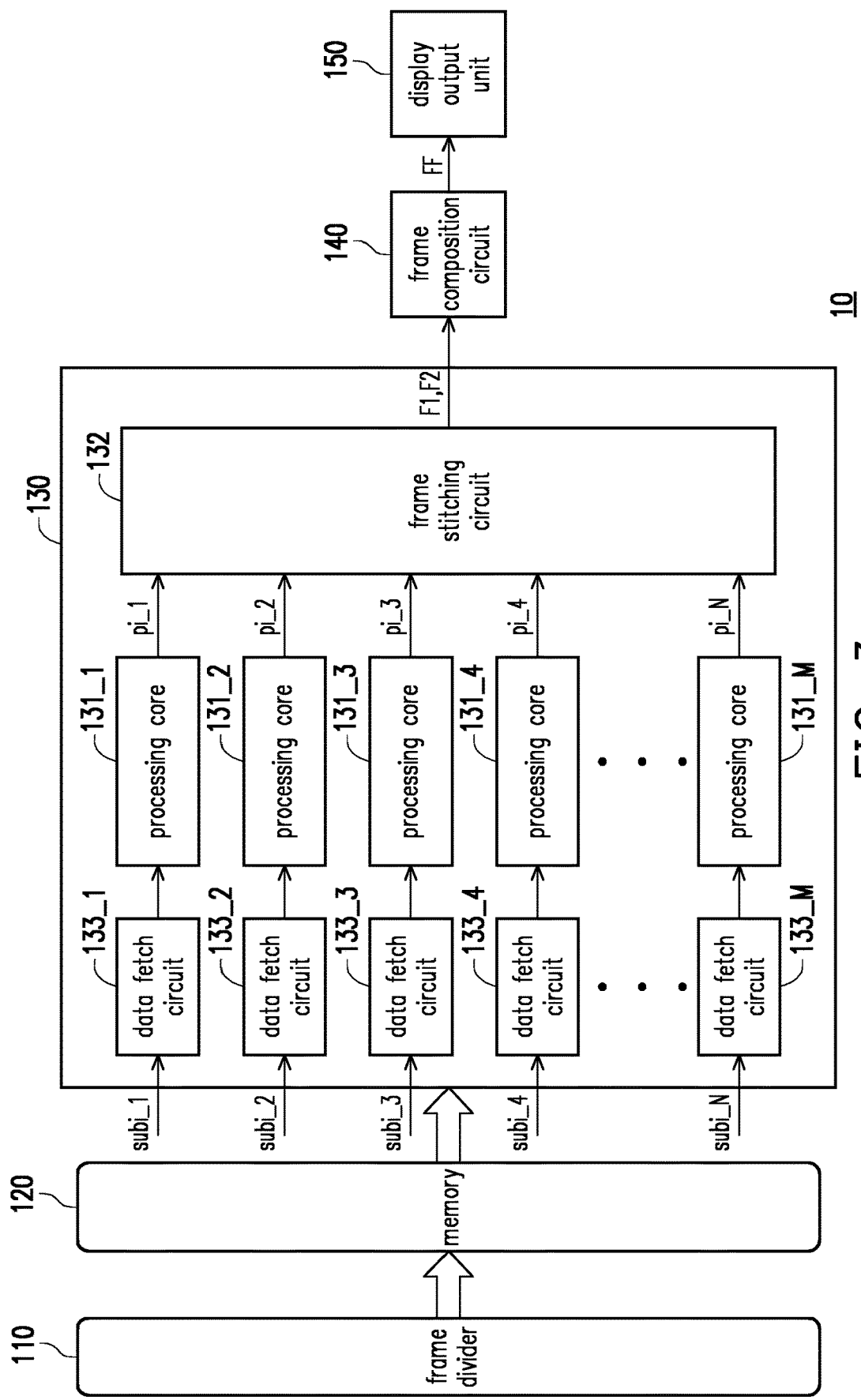
FIG. 3 is a schematic diagram of an image processing device according to an embodiment of the disclosure.

FIG. 3 is a schematic diagram of an image processing device according to an embodiment of disclosure. As shown in FIG. 3, in addition to the frame divider 110, the memory 120 and the multi-core circuit 130, the image processing device 10 may further include a frame composition circuit 140 and a display output unit 150.

The frame composition circuit 140 is coupled to the multi-core circuit 130, and composes the processed frame F1 belonging to a first layer and another processed frame F2 belonging to a second layer to generate an output frame FF. The processed frame F2 is also generated by the multi-core circuit 130 based on a method similar to the method describe in the above. That is, the frame composition circuit 140 may superimpose the processed frame F1 and the processed frame F2 to generate the output frame FF, so as to generate a multi-layer picture. Next, the display output unit 150 outputs the output frame FF.

According to an embodiment, the multi-core circuit 130 may further include multiple data fetch circuits 133_1 to 133_M. The data fetch circuits 133_1 to 133_M are one-to-one coupled to the processing cores 131_1 to 131_M for fetching pixel data from the memory 120. The data fetch circuits 133_1 to 133_M may be DMA circuits. In other words, the data fetch circuits 133_1 to 133_M are configured to fetch the extension pixels and the divided blocks subi_1 to subi_N from the memory 120 according to the column number of the extension pixels.

Based on the foregoing, the extension pixels fetched by the data fetch circuits 133_1 to 133_M may include multiple copied pixels and/or multiple non-copied pixels. In detail, according to an embodiment, the multiple divided blocks subi_1 to subi_N generated by the frame divider 110 include a first divided block and a second divided block. The first divided block is located at a vertical boundary of the original frame, and therefore the extension pixels of the first divided block include multiple copied pixels and multiple non-copied pixels. One of the data fetch circuits 133_1 to 133_M fetches the 1$^{st}$ column of the pixels of the first divided block to be the copied pixels, and one of the data fetch circuits 133_1 to 133_M fetches multiple columns of the pixels of the second divided block adjacent to the first divided block to be the non-copied pixels. Taking FIG. 2A as an example, the divided block subi_1 (i.e., the first divided block) is located at the vertical boundary of the original frame, and therefore the extension pixels EP_L1 of the divided block subi_1 include the multiple copied pixels, and the extension pixels EP_R1 of the divided block subi_1 include the multiple non-copied pixels. The data fetch circuit 133_1 fetches the 1$^{st}$ column of the pixels of the divided block subi_1 to be the copied pixels, and fetches the multiple columns of the pixels of the divided block subi_2 (i.e., the second divided block) to be the non-copied pixels.

In addition, according to an embodiment, the multi-core circuit 130 determines the number of enabled ones of the processing cores 131_1 to 131_M according to a frame size of the original frame and an image output format of the image processing device 10. Here, the number of the enabled ones of processing cores 131_1 to 131_M is equal to the number N of the divided blocks subi_1 to subi_N. For example, if the image output format of the image processing device 10 specifies a frame rate of 60 frames per second and 8K frame resolution (8K @ p60), and each of the processing cores 131_1 to 131_M provides the performance of the frame rate of 60 frames per second and 4K frame resolution (4K @ p60), the multi-core circuit 130 has to enable at least the four processing cores 131_1 to 131_4. Under limited hardware conditions, the image processing device 10 may decide to turn the processing cores 131_1 to 131_M on or off to enhance the performance and to save power. For example, according to an embodiment, the image processing device 10 may decide to enable at least the two processing cores 131_1 to 131_2, which may generate an output result conforming to the image output format and save power.

Table 1 is an example of determining the number of enabled ones of the processing cores 131_1 to 131_M according to an embodiment. However, Table 1 is merely an exemplary description and is not intended to limit the disclosure. According to the example of Table 1, in view of throughput required by 2K resolution and supported by a size of a data line buffer installed for the processing cores 131_1 to 131_M, the multi-core circuit 130 may determine the number of enabled ones of the processing cores 131_1 to 131_M based on Table 1.

TABLE 1

| Size of original frame | Image output format | Number of divided blocks (number of enabled processing cores) |
|---|---|---|
| 8K | * | 4 |
| less than or equal to 4k | 8 Kp@60 | 4 |
| less than or equal to 4k | 4 Kp@60 | 4 or 2 |
| less than or equal to 4k | 1080 p@60 or lower resolution | 4 or 2 or 1 |

In addition, according to an embodiment, the image processing process performed by the processing cores 131_1 to 131_M includes the image scaling process, and the processing cores 131_1 to 131_M perform the image scaling process according to a polyphase interpolation method, such as a 4-tap or 8-tap cubic convolution interpolation method. According to the polyphase interpolation method, phase information of each output pixel is calculated first. The processing cores 131_1 to 131_M have to obtain corresponding weight information according to the phase information of the output pixels, so as to calculate pixel values of the output pixels according to the obtained weight information and input pixels. According to an embodiment, the processing cores 131_1 to 131_M may be respectively implemented as polyphase interpolation filters, and filter coefficients of the polyphase interpolation filters are determined according to the phase information of the output pixels. For example, the processing cores 131_1 to 131_M may obtain the corresponding filter coefficients according to a lookup table of the phase information of the output pixels, so as to calculate the pixel values of the output pixels. Taking the 4-tap polyphase interpolation filter as an example, the processing cores 131_1 to 131_M have to fetch four input pixels and four weight values associated with the phase information to perform a weighted operation to generate the output pixels.

According to an embodiment, the processing cores 131_1 to 131_M calculate the phase information of multiple pixels in the processed frame blocks pi_1 to pi_N according to the size of the original frame and the size of the processed frame F1. The multiple pixels in the processed frame blocks pi_1 to pi_N (i.e., output pixels of the image scaling process) which are generated by the processing cores 131_1 to 131_M after the image scaling process respectively have phase information associated with the polyphase interpolation method. The processing cores 131_1 to 131_M calculate the pixel values of the pixels in the processed frame blocks pi_1 to pi_N according to the phase information of the pixels in the processed frame blocks pi_1 to pi_N. In addition, the frame stitching circuit 132 extracts multiple frame blocks to be stitched from the processed frame blocks pi_1 to pi_N according to the phase information of the pixels in the processed frame blocks pi_1 to pi_N, and stitches the frame blocks to be stitched to generate the processed frame F1.

According to an embodiment, the processed frame blocks pi_1 to pi_N may include a first processed frame block and a second processed frame block. The frame stitching circuit 132 fetches the first frame block to be stitched of the frame blocks to be stitched from the first processed frame block, and fetches the second frame block to be stitched of the frame blocks to be stitched from the second processed frame block. In addition, the phase information of an outer valid pixel in the first frame block to be stitched is identical to the phase information of an invalid pixel adjacent to the second frame block to be stitched in the second processed frame block. For example, in a case where pixels are horizontally magnified two times, a position step value between the pixels is changed from 1 to 0.5, and therefore left-to-right phase information of the magnified pixels is converted to 1, 1.5, 2.5 . . . . Correspondingly, the pixels in the processed frame blocks generated by the respective processing cores 131_1 to 131_M also have corresponding phase information. Therefore, the frame stitching circuit 132 may extract the second frame block to be stitched from the second processed frame block for stitching according to the phase information of the outer valid pixel in the first frame block to be stitched. Based on the foregoing, the phase information of the pixels in the processed frame F1 composed of the frame blocks to be stitched is continuous.

According to an embodiment, the frame stitching circuit 132 may extract the first frame block to be stitched from the first processed frame block according to a scaling ratio of the image scaling process and the column number of the extension pixels. Next, the frame stitching circuit 132 may further extract the second frame block to be stitched from the second processed frame block according to the phase information of the outer valid pixel in the first frame block to be stitched. As a result, since the frame stitching circuit 132 extracts specific pixels for stitching based on the phase information of the pixels in the processed frame blocks pi_1 to pi_N, the processed frame F1 generated after the image stitching process does not include abnormal stitching defects.

Figure 4:
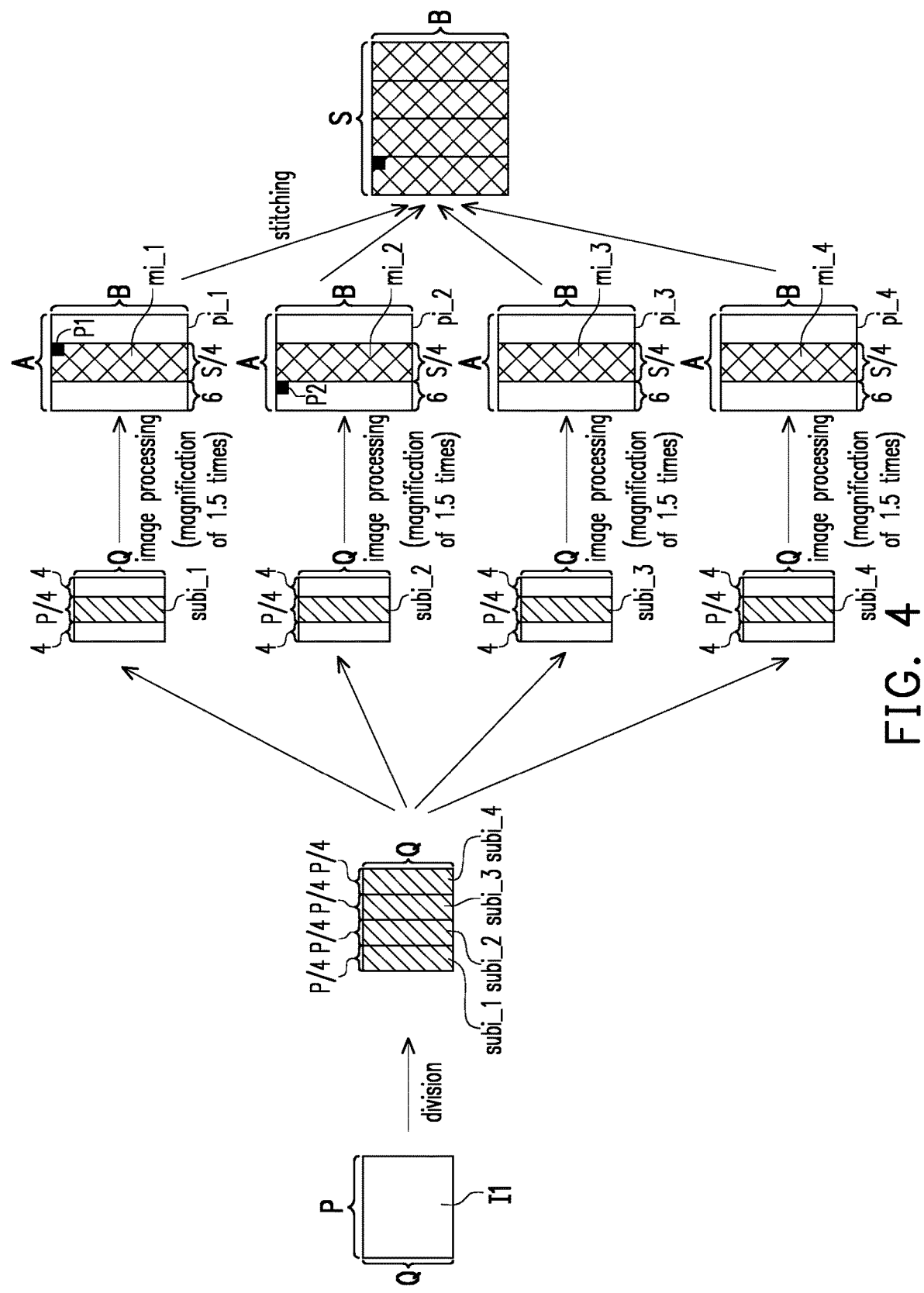
FIG. 4 is a schematic diagram illustrating an image processing method according to an embodiment of the disclosure.

In detail, FIG. 4 is a schematic diagram illustrating an image processing method according to an embodiment of the disclosure. Here, it is assumed that the number of the divided blocks is four, the column number of the extension pixels in each of the divided block is four, and the size (or resolution) of the original image frame is P*Q. As shown in FIG. 4, an original frame I1 with a size of P*Q is divided into four divided blocks subi_1 to subi_4 by the frame divider 130. A size of each of the divided blocks subi_1 to subi_4 is P/4*Q. Next, four processing cores 131_1 to 131_4 may fetch the divided blocks subi_1 to subi_4 and four left columns and four right columns of the extension pixels for the image scaling process and other image processing processes, to generate processed frame blocks pi_1 to pi_4. If a vertical scaling ratio and a horizontal scaling ratio are both 1.5 times, sizes of the processed frame blocks pi_1 to pi_4 are A*B. Accordingly, A is equal to (P/4+8)*1.5, and B is equal to Q*1.5. Finally, the frame stitching circuit 132 respectively fetches four frame blocks to be stitched mi_1 to mi_4 from the processed frame blocks pi_1 to pi_4 for stitching to generate a processed frame F1 having a frame output size of S*B. Sizes of the frame blocks to be stitched mi_1 to mi_4 are S/4*B. That is, the frame stitching circuit 132 fetches S/4 columns of pixels from the A columns of pixels of the processed frame blocks pi_1 to pi_4 to be the frame blocks to be stitched mi_1 to mi_4. Here, the phase information of an outer valid pixel P1 in the frame block to be stitched mi_1 is identical to the phase information of an invalid pixel P2 adjacent to the frame block to be stitched mi_2 and located in the processed frame block pi_2.

More specifically, according to this example, since the column number of the extension pixels is four and the scaling ratio is 1.5, the frame stitching circuit 132 is aware that the processed frame block pi_1 includes information of six columns of copied pixels. Therefore, the frame stitching circuit 132 may fetch the frame block to be stitched mi_1 with a size of S/4*B from the $7^{th}$ column of the pixels of the processed frame block pi_1. Next, the frame stitching circuit 132 may search for the invalid pixel P2 having the identical phase information from the processed frame block pi_2 according to the phase information of the valid pixel P1 located in the last column of the frame block to be stitched mi_1, and fetch the frame block to be stitched mi_2 with a size of S/4*B from a column next to the invalid pixel P2 located in the processed frame block pi_2.

In addition, according to alternative embodiments, functions related to the frame divider 110, the multi-core circuit 130, the frame composition circuit 140, and/or the display output unit 150 may be implemented as software, firmware or hardware programed by common programming languages (e.g., C or C++), hardware description languages (e.g., Verilog HDL or VHDL) or the like. The software (or firmware) capable of performing the related functions may be arranged by means of any known computer-accessible medias, such as magnetic tapes, semiconductor memories, magnetic disks or compact disks (e.g., CD-ROM or DVD-ROM). The software (or firmware) may be stored in an accessible medium (such as a memory) of a computer, such that a processor of the computer may access/execute programming codes of the software (or firmware) to perform the related functions.

Figure 5:
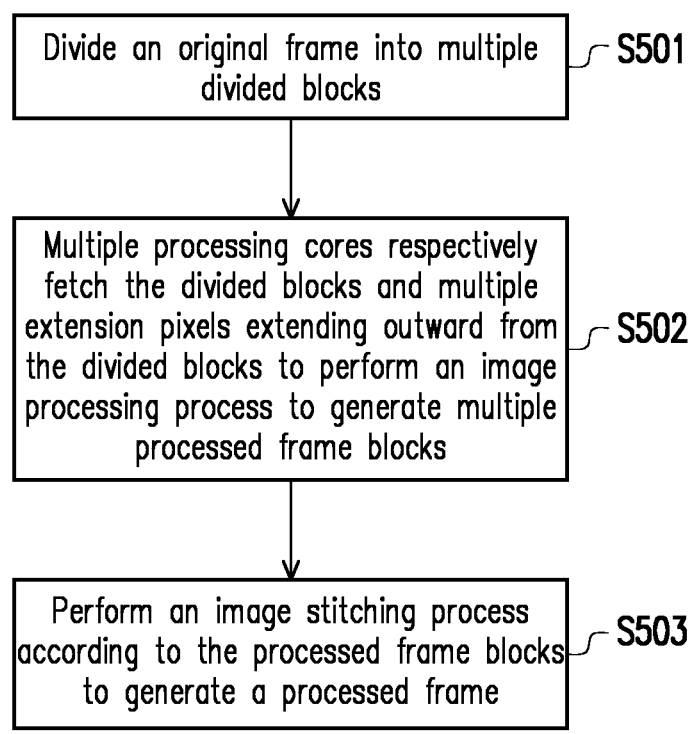
FIG. 5 is a flowchart of an image processing method according to an embodiment of the disclosure.

FIG. 5 is a flowchart of an image processing method according to an embodiment of disclosure. In addition, for related implementation details and device features of the image processing method of this embodiment, please refer to the above descriptions regarding the embodiments of FIGS. 1 to 4 to obtain sufficient teaching, suggestions, and implementations, which will not be repeated herein.

In a step S501, an original frame is divided into multiple divided blocks. In a step S502, multiple processing cores respectively fetch the divided blocks and multiple extension pixels extending outward from the divided blocks to perform an image processing process to generate multiple processed frame blocks. A column number of the extension pixels is configured by a window size requested by a window algorithm of the image processing process. In a step S503, an image stitching process is performed according to the processed frame blocks to generate a processed frame.

To sum up, according to the embodiments of the disclosure, even under limited hardware conditions, the multiple processing cores may be employed to perform in parallel the image processing process on the multiple divided frame blocks to enhance performance. As such, in response to a display requiring high display specification, the multiple processing cores may be enabled to achieve good display performance. In addition, the column number of pixels is determined and flexibly configured according to the window size requested by the window algorithm of an image processing algorithm, which not only can correctly calculate pixel information of division boundaries, but also can facilitate an upgrade of the window algorithm and broaden the applicable scope. Moreover, by employing the image stitching process based on phase alignment, an output image having good display effect and no defect can be generated to fulfill the effect of displaying a seamless picture.

Although the disclosure is described with reference to the above embodiments, the embodiments are not intended to limit the disclosure. A person of ordinary skill in the art may make variations and modifications without departing from the spirit and scope of the disclosure. Therefore, the protection scope of the disclosure should be subject to the appended claims.

What is claimed is:

1. An image processing device, comprising:
   a frame divider dividing an original frame into a plurality of divided blocks;
   a multi-core circuit, comprising:
   a plurality of processing cores performing an image processing process on the plurality of divided blocks to generate a plurality of processed frame blocks; and
   a frame stitching circuit, coupled to the plurality of processing cores, performing an image stitching process according to the plurality of processed frame blocks to generate a processed frame,
   wherein the plurality of processing cores fetch the plurality of divided blocks and a plurality of extension pixels extending from the plurality of divided blocks to perform the image processing process, and a column number of the plurality of extension pixels is configured according to a window size requested by a window algorithm of the image processing process.

2. The image processing device of claim 1, wherein the image processing process comprises an image scaling process, and the plurality of processing cores perform the image scaling process according to a polyphase interpolation method.

3. The image processing device of claim 2, wherein the image processing process further comprises an image denoising process, a high dynamic range adjustment process, an image contrast adjustment process, an image tone adjustment process, an image sharpness adjustment process, a color space conversion process, or a combination thereof.

4. The image processing device of claim 2, wherein a plurality of pixels located in the plurality of processed frame blocks have phase information associated with a cubic convolution interpolation method, the plurality of processing cores calculate pixel values of the plurality of pixels located in the plurality of processed frame blocks according to the phase information of the plurality of pixels located in the plurality processed frame blocks,
   wherein the frame stitching circuit fetches a plurality of frame blocks to be stitched from the plurality of processed frame blocks according to the phase information of the plurality of pixels located in the plurality of processed frame blocks, and stitches the plurality of frame blocks to be stitched to generate the processed frame.

5. The image processing device of claim 4, wherein the plurality of processed frame blocks comprise a first processed frame block and a second processed frame block, the frame stitching circuit fetches a first frame block to be stitched of the plurality of frame blocks to be stitched from the first processed frame block and fetches a second frame block to be stitched of the plurality of frame blocks to be stitched from the second processed frame block,
   wherein the phase information of an outer valid pixel located in the first frame block to be stitched is identical to the phase information of an invalid pixel adjacent to the second frame block to be stitched in the second processed frame block.

6. The image processing device of claim 5, wherein the frame stitching circuit fetches the first frame block to be stitched from the first processed frame block according to a scaling ratio of the image scaling process and the column number of the plurality of extension pixels.

7. The image processing device of claim 1, further comprising:
   a frame composition circuit, coupled to the multi-core circuit, composing the processed frame belonging to a first layer and another processed frame belonging to a second layer to generate an output frame.

8. The image processing device of claim 1, wherein the image processing process comprises a first image processing process in which a first window algorithm is applied and a second image processing process in which a second window algorithm is applied, a window size of the first window algorithm is a first value, a window size of the second window algorithm is a second value, and the column number of the plurality of extension pixels is configured according to the first value or the second value.

9. The image processing device of claim 1, wherein the multi-core circuit determines the number of enabled processing cores of the plurality of processing cores according to a frame size of the original frame and an image output format of the image processing device.

10. The image processing device of claim 1, wherein the image processing device further comprises a memory, and the multi-core circuit further comprises a plurality of data fetch circuits, wherein the plurality of data fetch circuits are one-to-one coupled to the plurality of processing cores, and fetch the plurality of extension pixels and the plurality of divided blocks from the memory according to the column number of the plurality of extension pixels.

11. The image processing device of claim 10, wherein the plurality of divided blocks comprise a first divided block and a second divided block,
   wherein the first divided block is located at a vertical boundary of the original frame, extension pixels of the plurality of extension pixels belonging to the first divided block comprise a plurality of copied pixels and a plurality of non-copied pixels, one of the plurality of data fetch circuit fetches a first column of pixels of the first divided block to be the plurality of copied pixels, and one of the data fetch circuits fetches a plurality columns of pixels of the second divided block adjacent to the first divided block to be the plurality of non-copied pixels.

12. An image processing method, comprising:
   dividing an original frame into a plurality of divided blocks;
   by a plurality of processing cores, respectively fetching the plurality of divided blocks and a plurality of extension pixels extending from the plurality of divided blocks to perform an image processing process to generate a plurality of processed frame blocks, wherein a column number of the plurality of extension pixels is configured according to a window size requested by a window algorithm of the image processing process; and
   performing an image stitching process according to the plurality of processed frame blocks to generate a processed frame.

* * * * *